United States Patent [19]

Meyer et al.

[11] Patent Number: 5,348,699
[45] Date of Patent: Sep. 20, 1994

[54] FIBERS FROM COPOLYESTER BLENDS

[75] Inventors: August K. Meyer, Jonesborough; Johnny W. Shadden, Kingsport; Candace M. Stipe, Kingsport; Leron R. Dean, Kingsport, all of Tenn.

[73] Assignee: Eastman Chemical Company, Kingsport, Tenn.

[21] Appl. No.: 205,014

[22] Filed: Mar. 2, 1994

[51] Int. Cl.$^5$ .............................................. B29C 47/00
[52] U.S. Cl. ................... 264/176.1; 528/272; 528/307; 528/308.6; 525/444
[58] Field of Search ............ 528/272, 307, 308.6; 525/444; 264/176.1, 177.13, 177.19

[56] References Cited

U.S. PATENT DOCUMENTS

| | | | |
|---|---|---|---|
| 3,386,145 | 6/1968 | Harris | 28/64 |
| 4,035,441 | 7/1977 | Endo et al. | 264/171 |
| 4,263,364 | 4/1981 | Seymour et al. | 428/287 |
| 4,668,453 | 5/1987 | Ebnesajjad et al. | 264/78 |
| 4,668,764 | 5/1987 | Satou | 528/308.1 |

FOREIGN PATENT DOCUMENTS 1344492  1/1974  United Kingdom .

OTHER PUBLICATIONS

K. V. Datye et al., *Chemical Processing of Synthetic Fibers and Blends*, John Wiley & Sons, New York, p. 38 (1984).
A. B. Auerbach et al., *Polymer Engineering and Science*, vol. 30, No. 17, pp. 1041–1050 (1990).
Research Disclosure, vol. 252, No. 44 (No. 25244).

*Primary Examiner*—Samuel A. Acquah
*Attorney, Agent, or Firm*—John D. Thallemer

[57] ABSTRACT

This invention relates to a process for preparing copolyester fibers having reduced spinning defects. More particularly, the invention relates to fibers having improved quality prepared from blends of certain poly(ethylene terephthalate) compositions modified with 1,4-cyclohexanedimethanol by melt spinning to produce filaments with decreased spinning defects while maintaining the chemical resistance, abrasion resistance, electrical and mechanical properties normally associated with copolyesters. These polymer blends when heated provide a fiber-forming polymer melt/dope which has excellent flowability and produces high quality fiber when subjected to conventional melt spinning, drawing, texturing, etc. Staple fibers prepared from the polymer blends of the invention when made into high loft battings have excellent fiberfill performance properties, particularly resilience and compression recovery.

3 Claims, No Drawings

FIBERS FROM COPOLYESTER BLENDS

FIELD OF THE INVENTION

This invention relates to a process for preparing copolyester fibers having reduced spinning defects. More particularly, the invention relates to fibers having improved quality prepared from blends of certain poly(ethylene terephthalate) compositions modified with 1,4-cyclohexanedimethanol by melt spinning to produce filaments with decreased spinning defects while maintaining the chemical resistance, abrasion resistance, electrical and mechanical properties normally associated with copolyesters. These polymer blends when heated provide a fiber-forming polymer melt/dope which has excellent flowability and produces high quality fiber when subjected to conventional melt spinning, drawing, texturing, etc. Staple fibers prepared from the polymer blends of the invention when made into high loft battings have excellent fiberfill performance properties, particularly resilience and compression recovery.

BACKGROUND OF THE INVENTION

Many factors may contribute to fiber defects during melt spinning of fibers (K. V. Datye, A. A. Vaidya, Chemical Processing of Synthetic Fibers and Blends, John Wiley & Sons, New York, 1984, p 38). In particular, in the melt spinning of continuous multifilament synthetic yarns, malfunctions of the spinnerettes often produce enlarged sections in the yarn filaments which are known as "slubs" in yarn art language. These enlarged sections or "slubs" may also be produced by other malfunctions in the spinning process such as the breakage of filaments prior to or while they are being drafted. When a breakage of this type occurs, the broken filaments undergo no drafting in the spinning cabinet and thus an enlarged filament will result. Since the presence of these "slubs" appreciably detracts from the appearance, aesthetics and mechanical quality of the synthetic fiber structures being produced, it is extremely important to minimize or eliminate these defects.

The process of this invention unexpectedly allows the production of polyester fibers which have decreased "slub" formation and which, therefore, have improved quality and performance.

It is known that poly(1,4-cyclohexylene dimethylene terephthalate) (PCT) may be blended with conventional polyesters such as poly(ethylene terephthalate) and poly(butylene terephthalate) to lower the processing or extruding temperature of PCT to avoid degradation (Andrew B. Auerbach and Joseph W. Sell, Polymer Engineering and Science, 1990, Vol. 30, No. 17, pp 1041–1050).

British Pat. No. 1,344,492 discloses multicomponent filament fibers having high bulk prepared from at least two conjugated filamentary components in side-by-side relationship, one component (a) being formed from a homopolymer of ethyleneterephthalate (PET) and another component (b) being formed from a PET modified with 1,4-cyclohexanedimethanol as the reactive diol. There is no teaching of blending the polymeric components for components (a) and (b) and then spinning the polymer blends into filaments.

U.S. Pat. No. 4,668,764 easily dyeable polyester fibers comprising modified PET consisting of a copolyester having 80 to 98% of ethylene terephthalate units and wherein the monomer copolymerized with ethylene terephthalate is 1,4-cyclohexanedimethanol or 2,2-bis[4-(2-hydroxyethoxy)phenyl]propane. There is no teaching of blending poly(ethylene terephthalate) with poly(ethylene terephthalate) modified with 1,4-cyclohexanedimethanol or the blending of two different poly(ethylene terephthalate) polymers modified with two different levels of 1,4-cyclohexanedimethanol with subsequent spinning into fibers.

U.S. Pat. No. 4,263,364 discloses that reinforced stampable thermoplastic polyester sheets are advantageously made by combining layers of PET film and PET modified with 1,4-cyclohexanedimethanol (copolyester) film and fiberglass followed by heating under pressure. No mention is made of combining the two polymers followed by spinning into fibers.

Research Disclosure, Vol. 252, No. 44 (No. 25244) discloses that certain blends of (1) poly(ethylene terephthalate) modified with 1,4-cyclohexanedimethanol (CHDM) with (2) other poly(ethylene terephthalate) modified with CHDM but which contains a different mole percent of CHDM are compatible if the difference in mole percent of CHDM is no greater than about 50%. There is no teaching as regards the use of these blends to prepare improved fibers and manufacturing efficiencies thereof.

U.S. Pat. No. 4,668,453 discloses a cospun yarn essentially free of defects comprising poly(hexamethylene adipamide/caproamide) (nylon 6,6/6) filament and certain modified poly(ethylene terephthalate) filaments.

No teaching is present in any of the references to lead one to combine two different poly(ethylene terephthalate) polymers modified with different levels of 1,4-cyclohexanedimethanol followed by melt spinning in an attempt to produce fibers having fewer spinning defects.

SUMMARY OF THE INVENTION

Accordingly, it the object of the present invention is to provide a convenient and cost effective process for preparing polyester fibers which have fewer defects as a result of the melt spinning and subsequent processing steps, particularly fewer "slubs" which are enlarged sections in the yarn filaments.

This and other objects are accomplished herein by a process for preparing copolyester fibers having reduced spinning defects comprising the steps of:
(I) blending
  (A) 85–99 weight percent of a copolyester, Copolyester (A), having an inherent viscosity of 0.4 to 1.5 dl/g which consists essentially of
    (1) a dicarboxylic acid component consisting essentially of repeat units from terephthalic acid, and
    (2) a diol component consisting essentially of repeat units from 88 to 99.9 mole percent ethylene glycol and 0.1 to 12 mole percent 1,4-cyclohexanedimethanol, based on 100 mole percent dicarboxylic acid and 100 mole percent diol, and
  (B) 1 to 15 weight percent of a copolyester, Copolyester (B), having an inherent viscosity of 0.4 to 1.5 dl/g which consists essentially of
    (1) a dicarboxylic acid component consisting essentially of repeat units from terephthalic acid, and
    (2) a diol component consisting essentially of repeat units from 40 to 82 mole percent ethylene glycol and 18 to 60 mole 1,4-cyclohexanedimethanol, based on 100 mole percent dicarboxylic and 100 mole percent diol; it being understood that the combined weights of Copolyesters (A) and (B) total 100 percent;

(II) melt spinning said blend of Copolyester (A) and (B) at temperatures of 275° C. to 325° C. into fiber.

DESCRIPTION OF THE INVENTION

Component (A) of the present invention is a copolyester which contains repeat units from mixtures of terephthalic acid, ethylene glycol and 1,4-cyclohexanedimethanol, based on 100 mole percent dicarboxylic acid and 100 mole percent diol. The dicarboxylic acid component of Copolyester (A) consists essentially of repeat units from terephthalic acid. The diol component of Copolyester (A) consists essentially of 88 to 99.9 mole percent ethylene glycol and 0.1 to 12 mole percent 1,4-cyclohexanedimethanol. Preferably, the diol portion consists of 97 to 99 mole percent ethylene glycol and 1 to 3 percent 1,4-cyclohexanedimethanol. The term "consists essentially of" means that in addition to the terephthalic acid, 1,4-cyclohexanedimethanol and ethylene glycol, other dicarboxylic acids and diols may be present in Copolyester (A) provided that the basic and essential characteristics of the copolyester are not materially affected thereby.

For example, Copolyester (A) may optionally be modified with up to about 3 mole percent, based on 100 mole percent dicarboxylic acid, of one or more different dicarboxylic acids other than terephthalic acid or suitable synthetic equivalents. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like.

In addition, Copolyester (A) may optionally be modified with up to about 3 mole percent, based on 100 mole percent diol, of one or more different diols other than, 1,4-cyclohexanedimethanol and ethylene glycol. Such additional diols include cycloaliphatic diols preferably having 6 to 15 carbon atoms or aliphatic diols preferably having 2 to 8 carbon atoms. Examples of such diols to be included with 1,4-cyclohexanedimethanol and ethylene glycol are: propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,2-bis-(4-hydroxypropgxyphenyl)-propane, and the like.

Copolyester (A) has an inherent viscosity of about 0.4 to about 1.5 dl/g, preferably 0.5 to 1.1 dl/g, and more preferably 0.6 to 0.8 dl/g. Copolyester (A), containing substantially only 1,4-cyclohexanedimethanol, ethylene glycol and terephthalic acid is preferred.

The second component (B) of the invention is a copolyester, Copolyester (B), which contains repeat units from mixtures of terephthalic acid, ethylene glycol and 1,4-cyclohexanedimethanol, based on 100 mole percent dicarboxylic acid and 100 mole percent diol. The dicarboxylic acid component of Copolyester (B) consists essentially of repeat units from terephthalic acid. The diol component of Copolyester (B) consists essentially of 40 to 82 mole percent ethylene glycol and 18 to 60 mole percent 1,4-cyclohexanedimethanol. Preferably, the diol portion consists of 66 to 72 mole percent ethylene glycol and 28 to 34 percent 1,4-cyclohexanedimethanol. The term "consists essentially of" means that in addition to the terephthalic acid, 1,4-cyclohexanedimethanol and ethylene glycol, other dicarboxylic acids and diols may be present in Copolyester (B) provided that the basic and essential characteristics of the copolyester are not materially affected thereby.

Copolyester (B) may optionally be modified with up to about 3 mole percent, based on 100 mole percent dicarboxylic acid, of one or more different dicarboxylic acids other than terephthalic acid or suitable synthetic equivalents. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like.

In addition, Copolyester (B) may optionally be modified with up to about 3 mole percent, based on 100 mole percent diol, of one or more different diols other than 1,4-cyclohexanedimethanol and ethylene glycol. Such additional diols include cycloaliphatic diols preferably having 6 to 15 carbon atoms or aliphatic diols preferably having 2 to 8 carbon atoms. Examples of such diols to be included with 1,4-cyclohexanedimethanol and ethylene glycol are: propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like.

Copolyester (B) has an inherent viscosity of about 0.4 to about 1.5 dl/g, preferably 0.5 to 1.1 dl/g, and more preferably 0.6 to 0.8 dl/g. Copolyester (B), containing substantially only 1,4-cyclohexanedimethanol, ethylene glycol and terephthalic acid is preferred.

The copolyesters useful in the invention can be prepared by conventional polycondensation procedures well-known in the art. Such processes include direct condensation of the acid with the glycol or by ester interchange using lower alkyl esters. Depending on the degree of crystallization, the polyesters may also be subjected to solid state polymerization methods.

Many other ingredients can be added to the compositions of the present invention to enhance the performance properties of the blends. For example, brighteners, antioxidants, delusterants, metal deactivators, dyes, pigments, phosphate stabilizers, mold release agents, fillers, nucleating agents, ultraviolet light and heat stabilizers, lubricants, flame retardants and the like, can be included herein. All of these additives and the use thereof are well known in the art. Any of these compounds can be used so long as they do not hinder the present invention from accomplishing its objects. Such additives may be added to either Copolyester (A), Copolyester (B) or both, but it is particularly useful to add one or more of the additives to the more amorphous Copolyester (B) because of the improved compatibility.

The process for preparing the copolyester blends of the present invention involve preparing Copolyester (A) and Copolyester (B), respectively, by processes as mentioned previously. Normally, the copolyesters are dried in an atmosphere of dry air or dry nitrogen or under reduced pressure. The two copolymers are then blended together, normally in pellet form, and the "salt and pepper" blend subsequently melt spun. Alternatively, Copolyester (A) and Copolyester (B) may be melt blended to produce a more homogenous blend which may be melt spun as before. Melt blending and melt spinning temperatures are usually in the range of about 275° C. to 325° C.

The range of composition of the blends is from about 85 to 99 weight percent Copolyester (A) and from about 1 to 15 weight percent Copolyester (B). The preferred compositional range is from 88 to 95 weight percent of Copolyester (A) and from 5 to 12 weight percent of Copolyester (B).

The materials and testing procedures used for the results shown herein are as follows:

Inherent viscosity (I.V.) was measured at 23° C. using 0.50 grams of polymer per 100 ml of a solvent consisting of 60% by weight phenol and 40% by weight tetrachloroethane.

Defect detection to determine the improved quality of fibers (fewer "slubs"/pounds of fiber) is described in detail in U.S. Pat. No. 3,386,145 which is incorporated herein by reference. The defect detection system utilizes a filamentary monitoring device incorporating a guide arrangement that bands (i.e. spreads) a multifilament yarn-like tow into a web of side-by-side filaments while at the same time monitoring each of these filament for irregularities of a predetermined size.

The process of the present invention will be further illustrated by a consideration of the following examples, which are intended to be exemplary of the invention. All parts and percentages in the examples are on a weight basis unless otherwise stated.

EXAMPLE 1

(94% Copolymer A, 6% Copolymer B)

Copolyester A is 100 mole % terephthalic acid, 98.5 mole % ethylene glycol and 1.5 mole % 1,4-cyclohexanedimethanol having an I.V. of 0.7 dl/g.

Copolyester B is 100 mole % terephthalic acid, 69 mole % ethylene glycol, 31 mole % 1,4-cyclohexanedimethanol having an I.V. of 0.7 dl/g.

Copolymer A [282 lbs. (127.92 kg) pellets] and Copolymer B [18 lbs. (8.16 kg) pellets] were blended together and dried in a Patterson rotary dryer for 16 hours at 70° C. and at less than 25 mm Hg (3.33 kPa) pressure and then dropped into a feed bin blanketed with nitrogen of a Davis Extruder (Davis-Stantard, Div. of Crompton and Knowles Corporation) with a 1¾ inch (4.45 cm) (diameter) and 28:1 (ratio of length to diameter) Mather screw and then extruded at 295° C. at a rate of 69.5 lbs (31.53 kg)/hr. The molten blend was melt spun through a spinneret containing 150 orifices per 1.0 mm diameter to give filaments having a target denier/filament of 45, which were passed into a quench air cabinet and the yarn collected at a rate of 700 meter/min. As the filaments left the quench air cabinet, the strand was passed through a defect counter which consisted of a microswitch connected to a movable bar and a stationary bar with a setting of 0.010 inch (0.025 cm) between the bars. When a spinning defect of greater than 0.010 inch (0.025 cm) passed between the bars, the microswitch was tripped and a counter was activated which counted the defects per pound of fiber extruded. The above procedure was repeated exactly with two additional 300 pound (136.08 kg) polymer blends. The average number of defects per pound of fiber for the three runs was 0.0096.

EXAMPLE 2

(88% Copolymer A, 12% Copolymer B)

Copolymer A (same as Example 1) [264 lbs (119.75 kg) pellets] and Copolymer B (same as Example 1) [36 lbs (16.33 kg) pellets] were blended and spun into filaments and the fiber defects counted exactly as described in Example 1. The above procedure was repeated with four additional 300 pound (136.08 kg) polymer blends. The average number of defects per pound of fiber for the four runs was 0.000.

Comparative Example (100% Copolymer A)

Copolymer A (same as Example 1) (300 lbs, 136.08 kg) was dried and spun into fiber and the defects were determined by the method as set forth above. The procedure was repeated three times. The average defect rate for the four runs was 0.0252 per pound of fiber.

Examples 1 and 2 and the comparative example indicate that the blends of Copolyesters A and B resulted in fibers having significant reductions in defects as compared to employing the homopolymer, Copolyester A alone. It is important to note that Copolyester B was too amorphous to prepare a high end use fiber alone. It is unexpected that a higher quality fiber, having fewer defects ("slubs"), could be prepared by blending Copolyester A and Copolyester B followed by melt spinning compared to the fibers obtained under similar conditions from the two copolymers individually.

Many variations will suggest themselves to those skilled in this art in light of the above detailed description. All such obvious modifications are within the full intended scope of the appended claims.

What is claimed is:

1. A process for preparing copolyester fibers having reduced spinning defects comprising the steps of:
(I) blending
   (A) 85–99 weight percent of a copolyester, Copolyester (A), having an inherent viscosity of 0.4 to 1.5 dl/g which consists essentially of
      (1) a dicarboxylic acid component consisting essentially of repeat units from terephthalic acid, and
      (2) a diol component consisting essentially of repeat units from 88 to 99.9 mole percent ethylene glycol and 0.1 to 12 mole percent 1,4-cyclohexanedimethanol, based on 100 mole percent dicarboxylic acid and 100 mole percent diol, and
   (B) 1 to 15 weight percent of a copolyester, Copolyester (B), having an inherent viscosity of 0.4 to 1.5 dl/g which consists essentially of
      (1) a dicarboxylic acid component consisting essentially of repeat units from terephthalic acid, and
      (2) a diol component consisting essentially of repeat units from 40 to 82 mole percent ethylene glycol and 18 to 60 mole 1,4-cyclohexanedimethanol, based on 100 mole percent dicarboxylic and 100 mole percent diol; the combined weights of Copolyesters (A) and (B) total 100 percent;
(II) melt spinning said blend of Copolyester (A) and (B) at temperatures of 275° C. to 325° C. into fiber.

2. A process for preparing copolyester fibers having reduced spinning defects comprising the steps of:
(I) blending
 (A) 87–95 weight percent of a copolyester, Copolyester (A), having an inherent viscosity of 0.5 to 1.1 dl/g which consists essentially of
  (1) a dicarboxylic acid component consisting essentially of repeat units from terephthalic acid, and
  (2) a diol component consisting essentially of repeat units from 97 to 99 mole percent ethylene glycol and 1 to 3 mole percent 1,4-cyclohexanedimethanol, based on 100 mole percent dicarboxylic acid and 100 mole percent diol, and
 (B) 5 to 13 weight percent of a copolyester, Copolyester (B), having an inherent viscosity of 0.5 to 1.1 dl/g which consists essentially of
  (1) a dicarboxylic acid component consisting essentially of repeat units from terephthalic acid, and
  (2) a diol component consisting essentially of repeat units from 66 to 72 mole percent ethylene glycol and 28 to 34 mole 1,4-cyclohexanedimethanol, based on 100 mole percent dicarboxylic and 100 mole percent diol; the combined weights of Copolyesters (A) and (B) total 100 percent;
(II) melt spinning said blend of Copolyester (A) and (B) at temperatures of 275° C. to 325° C. into fiber.

3. A process for preparing copolyester fibers having reduced spinning defects comprising the steps of:
(I) blending
 (A) 87–90 weight percent of a copolyester, Copolyester (A), having an inherent viscosity of 0.6 to 0.8 dl/g which consists essentially of
  (1) a dicarboxylic acid component consisting essentially of repeat units from terephthalic acid, and
  (2) a diol component consisting essentially of repeat units from 97 to 99 mole percent ethylene glycol and 1 to 3 mole percent 1,4-cyclohexanedimethanol, based on 100 mole percent dicarboxylic acid and 100 mole percent diol, and
 (B) 10 to 13 weight percent of a copolyester, Copolyester (B), having an inherent viscosity of 0.6 to 0.8 dl/g which consists essentially of
  (1) a dicarboxylic acid component consisting essentially of repeat units from terephthalic acid, and
  (2) a diol component consisting essentially of repeat units from 66 to 72 mole percent ethylene glycol and 28 to 34 mole 1,4-cyclohexanedimethanol, based on 100 mole percent dicarboxylic and 100 mole percent diol; the combined weights of Copolyesters (A) and (B) total 100 percent;
(II) melt spinning said blend of Copolyester (A) and (B) at temperatures of 275° C. to 325° C. into fiber.

* * * * *